Nov. 15, 1966 R. K. YORK 3,286,036
TELEPHONE LINE CIRCUIT
Filed June 4, 1963
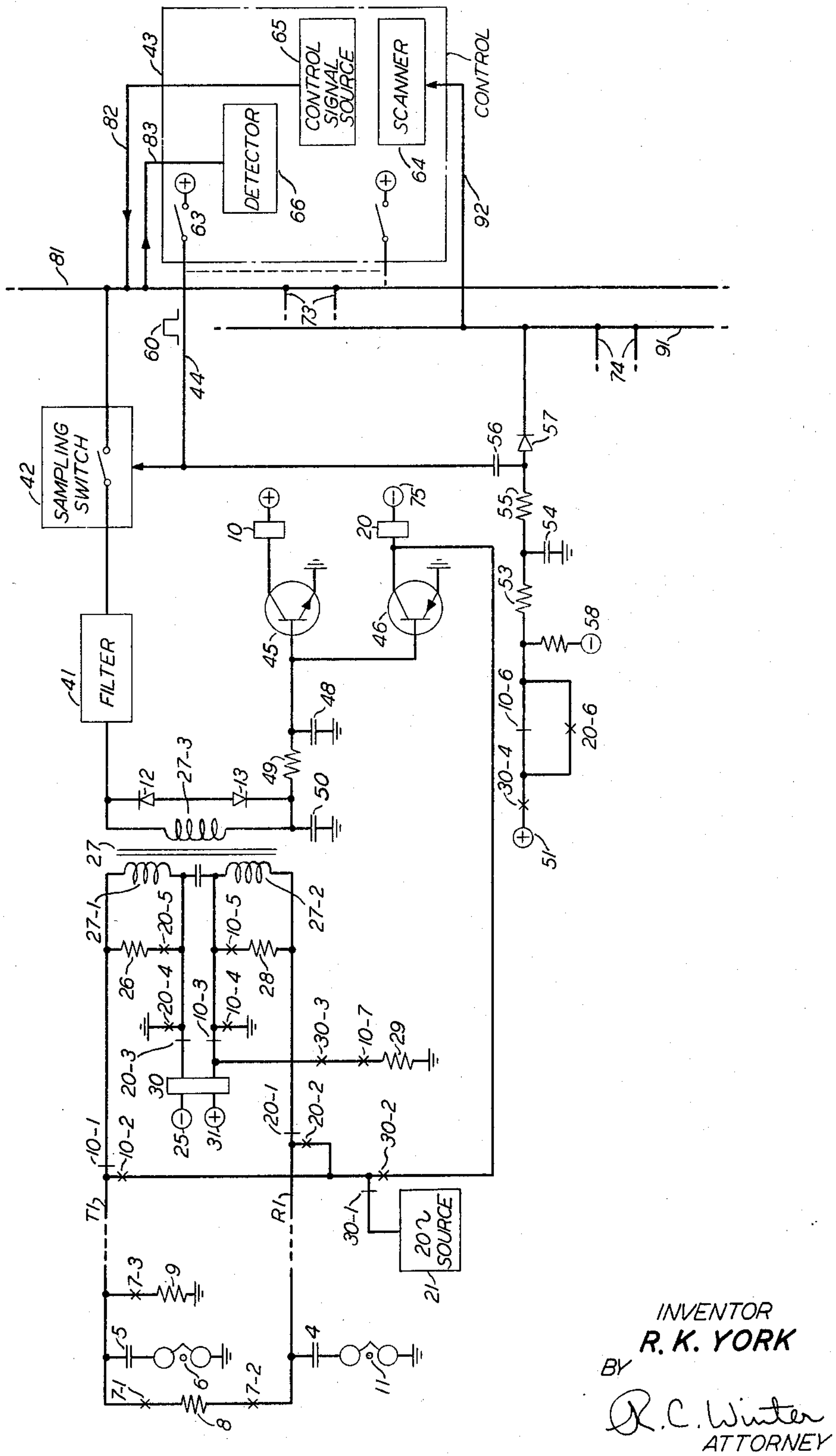
INVENTOR
R. K. YORK
BY R. C. Winter
ATTORNEY 3,286,036
Patented Nov. 15, 1966

3,286,036
TELEPHONE LINE CIRCUIT

Robert K. York, Piscataway Township, Middlesex County, N.J., assignor to Bell Telephone Laboratories, Incorporated, New York, N.Y., a corporation of New York Filed June 4, 1963, Ser. No. 285,371
14 Claims. (Cl. 179—17)

This invention relates to telephone line circuits and, more particularly, to line circuits for time division switching systems.

A time division switching system is one in which a plurality of lines and trunks are connected to a common bus. Each line or trunk is connected to the bus through a filter and gate network, and is served in a particular time slot in each cycle of system operation; that is, the gate associated with the line or trunk is closed to connect the line or trunk to the bus for only a fraction of each office cycle. Two interconnected lines, or an interconnected line and trunk, have their gates operated in the same time slot, and a physical connection is thus completed once in each office cycle. The gates thus serve as sampling switches, the gates sampling the continuous waveforms on the two interconnected channels. The essence of time division switching is that sufficient samples completely identify a continuous waveform. The filter connected to each sampling switch smoothes the samples, and in effect serves as a buffer between the continuous waveform on the line or trunk, and the sampled data of the switch.

A multi-party line is one serving two or more stations. The most common of these lines are the two- and four-party lines. The system must be capable of ringing each of the stations individually. In addition, it is often necessary for the system to be able to identify the two stations on a two-party line when a service request is originated. Numerous prior art circuits provide selective ringing for multi-party lines as well as two-party identification. These circuits however are not generally applicable to time division switching systems.

It is a general object of this invention to provide an improved multi-party line circuit having selective ringing and station identification for a time division switching system.

Two of the many supervisory functions that must be performed in a telephone system are the detection of a calling party's service request and the determination of his station identity. Conventional telephone line circuits provide separate equipment for both of these operations.

It is another object of this invention to provide the same equipment both for detecting a service request and for controlling the station identification sequence.

In some prior art time division switching systems, control signals for governing the operation of each line circuit are transmitted through the gate and filter associated with each line from the common bus to the respective line circuit. Typical of these signals are those which control the application of ringing current. The line circuit, in response to the control signals, connects a ringing source directly to the line. The answer by the called party is generally detected by equipment individual to each line.

It is another object of this invention to detect an answer by extending the ringing current applied to the called line in modified form through the respective filter and sampling switch to the common bus and control unit, whereby common equipment in the control unit serves a plurality of lines for verifying answers.

In the event the called station goes off-hook during the silent interval of the ringing there is no ringing current that may be extended from the line to the control unit for the purpose of enabling the latter to verify the answer. In electronic common control systems it is desirable that all supervisory information be received by the control as soon as it becomes available.

It is still another object of this invention to provide means for enabling the control unit to verify an answer as soon as the called station goes off-hook, and in the event the called station goes off-hook during the silent interval of the ringing to utilize the equipment normally used for detecting service requests for notifying the control unit of the answer.

In accordance with one illustrative embodiment of my invention each multi-party line is connected through a transformer, filter, and sampling switch to the common bus. A control unit governs the operation of each switch such that in the particular time slot serving the line, the line is connected to the bus. A system of this type is disclosed, for example, in F. S. Vigliante, R. D. Williams and E. L. Seley Patent 3,268,669, issued August 23, 1966. A separate scan bus, used solely for supervisory purposes rather than for talking purposes as well, is also provided. This bus is connected to the control unit, and also to each of the individual line circuits. Once in each office cycle the control unit applies a pulse to each line circuit. This pulse serves two functions. First, it closes the switch connecting the line to the common bus. In addition, this pulse is transmitted through the line circuit to the scan bus, and from the scan bus to the control unit in the event a station on the line being served is off-hook. Service requests are thus detected by the appearance of a control pulse on the scan bus in the time slot serving a particular line. This pulse, applied by the control unit to the line circuit, appears on the scan bus only if a station on the line has gone off-hook and has thereby operated a respective line relay.

For a terminating call the control unit governs the application of ringing current to either the tip conductor of a line to ring one station, or the ring conductor of the line to ring another station. The ringing current is of large magnitude and cannot be transmitted through the switch and filter in each line circuit. Consequently, the control unit causes a small magnitude control signal to be applied to the common bus at the same time that the control unit closes the gate of the line which is to be rung, the control signal not only indicating that ringing is to be applied but also which station is to be rung. The ringing control signal is thus transmitted only to the line circuit serving the line to be rung. The control signal controls circuitry in the line circuit which causes the ringing current to be applied to either the tip or ring conductor.

The tip and ring conductors of each line are connected to the coils of a respective line relay. During the ringing interval of the ringing sequence, the line relay is prevented from operating in the event a station on the line being rung goes off-hook. Contrary to conventional line circuits, the answer is not detected by the operation of a relay during that time when ringing current is actually applied to the line. Instead, the answer is detected in the following manner: If the ringing current is applied to the tip conductor it flows through the tip conductor to ground at the tip party station. When the tip party answers by going off-hook the tip and ring conductors are connected to each other through an impedance herein designated as the off-hook subset impedance, and the ringing current is now extended to the ring conductor. The tip and ring conductors are connected to two primary windings of the line transformer. When the ringing current is extended to the primary winding connected to the ring conductor, the ringing waveform is transmited through the transformer to the secondary winding. The secondary winding is connected through the respective filter and switch to the common bus. The control unit scans the common bus for the appearance of the ringing signal. The ringing signal appearing on the common bus is smaller in magnitude than that applied to the line itself, the orignal ringing current being reduced in magnitude when the called party goes off-hook due to the off-hook subset impedance. Consequently, the ringing current extended from the line circuit to the common bus and control unit may be transmitted through the filter and switch without requiring the latter to be capable of passing large magnitude signals. When the control unit detects the ringing current on the common bus during the time slot serving the particular line, verifying that the called party has answered, the control unit no longer applies the ringing control signal to the common bus and the ringing current is no longer applied to the tip conductor.

The control unit actually performs two different operations in the same numbered time slots serving the line in alternate cycles of system operation. During a first office cycle, and in the time slot during which the line switch is closed, the control unit applies the ringing control signal to the common bus for governing the application of the ringing current to the line in the respective line circuit. During the next office cycle and during the same time slot serving the line, the control unit does not apply the ringing control signal to the common bus, but instead scans the common bus for the appearance of the ringing signal. During this second cycle of system operation, the ringing signal is still applied to the line although no ringing control signals are transmitted to the respective line circuit. Means are provided in the line circuit for stretching the ringing control signal for at least two cycles of system operation. Thus in each office cycle in which it is applied, the ringing control signal governs the application of ringing current to the line for at least two cycles of system operation. During the second of each two cycles the common bus is scanned by the control unit for the appearance of the ringing current. When the ringing current is detected on the common bus, the control unit no longer applies ringing control signals to the bus in alternate time slots serving the line. The ringing source is disconnected from the line, and the called station is connected once in each cycle of system operation to the calling station.

Similarly, if a ring party is called, the ringing control signals applied by the control unit to the common bus in alternate time slots serving the line govern the application of ringing current to the ring rather than the tip conductor. When the ring party station goes off-hook, the current is extended to the tip conductor and flows through the primary winding of the transformer connected to this conductor. Once again the ringing current is extended through the filter and gate to the common bus where its appearance may be detected by the control unit in alternate time slots. The control unit, notified of the answer, no longer applies the ringing control signal to the common bus, and ringing current is removed from the line.

The period of each office cycle is considerably less than the ringing and silent intervals of the ringing operation. During the ringing interval, the ringing control signals are continuously applied to the common bus in every other time slot serving the line, and the common bus is scanned by the control unit for the appearance of the ringing current in the alternate time slots serving the line. During the silent interval however, no ringing control signals are applied to the common bus to be transmitted through the gate and filter to the line circuit. Thus, as no ringing current is applied to the line there is no ringing current which can be extended through the filter and gate to the common bus. Means are provided however for enabling the control unit to detect the answer immediately when the called station goes off-hook, even during a silent interval. Although the line relay is prevented from operating during the ringing interval, it is not so inhibited during the silent interval. Consequently, if the called station goes off-hook during the silent interval, the line relay operates as it does for a service request. Pulses thus appear on the scan bus. The control unit interprets these pulses as representing an answer rather than a service request, as the control unit already knows that a called party is on the line served in the particular time slot.

For an originating call it is necessary to identify the calling station for billing purposes. During the identification sequence, the line relay is held operated. However, control signals transmitted from the control unit to the line circuit prevent pulses from appearing on the scan bus. Only if the tip party originated the call are the pulses transmitted to the scan bus. Thus the appearance of the scan pulses on the scan bus during the identification sequence notifies the control unit that the tip party originated the call. The absence of these pulses is an indication that the ring party originated the call. The same equipment utilized for detecting a service request and an answer during the silent interval of the ringing is also utilized in the identification sequence.

It is a feature of this invention to provide means for controlling the application of ringing current in a multiparty line directly to the tip or ring conductors in response to control signals transmitted to the line circuit through a time division switching network and to control the detection of the called party's answer by the transmission of the ringing current from the line circuit through the time division switching network to the control unit.

It is another feature of this invention to provide means for enabling the control unit to immediately detect the called party's answer even if the called party goes off-hook during the silent interval of the ringing.

It is still another feature of this invention to utilize the same means for controlling the detection of a service request, the detection of an answer during the silent interval of the ringing, and the detection of the calling party's identity.

Further objects, features and advantages of the invention will become apparent upon consideration of the following detailed description in conjunction with the drawing in which the single figure discloses an illustrative embodiment of the invention.

*Originating call and call supervision*

The elements in the drawing comprise a two-party line circuit. Tip and ring conductors T1 and R1 serve the two stations connected to them. The tip station ringer 6 is connected through capacitor 5 to the tip conductor, and the ring station ringer 11 is connected through capacitor 4 to the ring conductor. Contacts 7–1 and 7–2 are closed when either station goes off-hook, while contacts 7–3 are closed only when the tip station is off-hook. Resistor 8 represents the impedance which connects the tip and ring conductors T1 and R1 when either station goes off-hook.

Common bus 81 is connected to all of the line circuits in the system. This bus may also be connected to trunk circuits if the latter are also included in this system. Conductors 73 symbolically represent these connections. Control 43 is connected to the illustrated line circuit by conductor 44, and to other line circuits by analogous conductors. Control 43 is not shown in detail; the present invention relates to line circuits, and is applicable to time division switching systems in general, the invention not being limited to use in any one particular system. When a pulse appears on conductor 44, the pulse originating from the operation of symbolic switch 63, sampling switch 42 closes, and conductors T1 and R1 are connected through the line circuit to the common bus. If at the same time a control pulse appears on one of the other conductors analogous to conductor 44 a talking path is established between tip and ring conductors T1 and R1 and another line or trunk. This physical path is completed only once in every office cycle, and the sampling period, the period of the physical connection or the width of control pulse 60, is determined by the number of lines served. Two parties may talk to each other when their respective sampling switches are operated in the same time slot in each cycle. Although only samples are thus transmitted to and from common bus 81, the filters, such as filter 41, smooth the samples so that continuous signals appear in the lines themselves.

Once in each cycle of operation control 43 applies the control pulse to conductor 44. This pulse in addition to closing sampling switch 42, is transmitted through capacitor 56 and diode 57 to scan bus 91, as explained below, if either station on the line is off-hook. The control is thus notified that the tip or ring party is off-hook. Scan bus 91 is common to all of the line circuits, as represented symbolically by conductors 74, and if a station on the particular line having applied to it a control pulse 60 is off-hook, the pulse appears on scan bus 91 and conductor 92, and is detected by scanner 64, thus notifying the control 43 of this condition. The pulse originating on conductor 44 is thus sent back to the control 43 once in every office cycle during the period that the tip or ring station is off-hook.

If neither party is originally using his subset, control 43 applies the pulse to conductor 44 only once in every 500 office cycles. Although this pulse closes sampling switch 42 there is no effect on the system as both stations on the line are on-hook, and common bus 81 is connected to no other line circuit in the same time slot. As will be shown below, however, after one of the stations goes off-hook, the next pulse on conductor 44 appears on conductor 92 is notify the control of the service request. A time slot is assigned to the line and pulses now appear on conductor 44 once every office cycle rather than once every 500 office cycles. The increased rate is required once a service request is originated because sampling switch 42 must be operated at a greater rate than once every 500 office cycles for the samples to sufficiently define the speech waveforms. When neither party is using the line however a slower rate is preferred as more time slots are then available to serve lines in use. For a terminating call, control 43 notes the identity of the called station and thereafter applies the control pulses to conductor 44 once every office cycle. In either event, i.e., for both originating and terminating calls, the control pulses on conductor 44 appear on conductor 92 once every office cycle for the duration of the call. The control is notified of the call's termination when the pulses on conductor 44 are no longer transmitted through the line circuit to scan bus 91 and conductor 92.

A service request by either party results in the operation of line relay 30. Current flows from source 31 through the lower relay winding, contacts 10–3, primary winding 27–2, contacts 20–1, the ring conductor, the off-hook subset impedance, the tip conductor, contacts 10–1, primary winding 27–1, contacts 20–3, and the upper winding of relay 30 to source 25. Relay 30 operates. Negative source 58 is sufficient, when contacts 30–4 are open, to reverse bias diode 57. Consequently, the control pulse applied to conductor 44 every 500 office cycles is not transmitted through the diode to the scan bus. However, when contacts 30–4 close the potential of positive source 51 is extended through these contacts, contacts 10–6, and resistors 53 and 55 to the diode. The diode is now forward biased, and the next control pulse on conductor 44 is transmitted through capacitor 56 and diode 57 to scan bus 91 to notify the control 43 of the service request.

The control pulses appear on conductor 92 for the duration of the call, except during the two-party identification sequence if the ring party originated the call, as explained below. When the station goes on-hook at the termination of the call, relay 30 releases and contacts

30–4. No pulses are thereafter transmitted to scan bus 91 in the time slot serving the line, and the control 43 is thus notified of the changed supervisory condition.

Capacitor 54 is provided to insure the appearance of control pulses 60 on conductor 92 even when the calling party is dialing. Although relay 30 may release during the dialing and contacts 30–4 may thus open, diode 57 remains forward biased. Capacitor 54 charges when contacts 30–4 are closed, and although the capacitor discharges into source 58 when the relay contacts open, the discharge period is sufficient to maintain diode 54 forward biased for the maximum time duration during which relay 30 may be released during dialing.

*Terminating call*

For ringing a called party in conventional telephone systems ringing current is applied through the switching network and the line circuit to the line. It is not practical however to apply ringing current through a time division switching network. The ringing voltage is of very large magnitude, and for the ringing signal to be transmitted through the time division switching network, sampling switch 42 and filter 41 must be capable of passing large magnitude signals. The design of these elements is considerably more complex if the ringing current itself is transmitted through the time division switching network. For this reason control 43 only transmits small magnitude control signals through the time division switching network to the various line circuits. The line circuits are provided with means for directly applying ringing signals to the line in response to the control signals.

Control signal source 65 in control 43 applies a small magnitude positive potential to common bus 81 over conductor 82 when a tip station is to be rung, and a small magnitude negative potential when a ring station is to be rung. If either station served by the line circuit is to be rung, the control signal on conductor 82 is applied during the same time slot in which the control pulse appears on conductor 44. Of all sampling switches in the system only sampling switch 42 operates in this time slot, and thus the control signal is transmitted only to the corresponding line circuit. The small magnitude positive or negative control potential is applied once in each cycle, and the samples are smoothed by filter 41 to provide a continuous D.C. voltage. Another filter, comprising capacitors 50 and 48, and resistor 49, further smoothes the control signal and insures that a continuous D.C. level is applied to the bases of transistors 45 and 46. The control potential is applied over conductor 82 once in every other office cycle for the duration of each interval of ringing. The pulses are not applied during the silent interval of the ringing. Consequently, a positive or negative voltage is applied to the transistor bases whenever a ringing interval is to take place, and no potential is applied when a silent interval is to ensue.

If control signal source 65 applies positive ringing control signals to the common bus, transistor 45 turns on and relay 10 operates. As contacts 10–1 and 10–3 open, relay 30 does not operate even when the called party subsequently goes off-hook. As contacts 10–2 are now closed, ringing current flows from source 21 through contacts 30–1 and 10–2, the tip conductor, capacitor 5 and ringer 6 to ground. The tip station is thus rung.

When the tip party answers and contacts 7–1 and 7–2 close, the ringing current is extended from the tip conductor to the ring conductor. The ring station is not rung however as the voltage across ringer 11 is considerably less in magnitude than the voltage of source 21 due to the off-hook subset impedance 8. The ringing current is extended along ring conductor R1, contacts 20–1, primary winding 27–2, and contacts 10–4 to ground. As the ringing current now flows through a primary winding of transformer 27, a ringing signal is induced in secondary winding 27–3. The signal is limited in magnitude by clamping Zener diodes 12 and 13. This ringing signal is transmitted through filter 41 and sampling switch 42 to common bus 81 each time a control pulse appears on conductor 44 to operate switch 42. The ringing signal samples on common bus 81 are transmitted over conductor 83 to detector 66 in control 43, and the control 43 is notified of the answer. Detector 66 scans conductor 83 for the ringing samples in alternate time slots, that is, in the same time slot in every other office cycle during which the ringing control potential is not applied on conductor 82. The ringing current thus serves not only to ring the called station, but in addition as a signal to be transmitted back through the switching network to the control unit to notify the latter of the called party's answer.

The positive ringing control signals are then no longer applied by the control to conductor 82, transistor 45 turns off and relay 10 releases. At this time the line current flows and relay 30 operates. As diode 57 is now forward biased the control pulses on conductor 44 appear on conductor 92 for the duration of the call.

If the ring station is to be rung rather than the tip station, control signal source 65 applies negative ringing control signals to common bus 81 over conductor 82. A continuous negative potential is now applied to the bases of transistors 45 and 46, and transistor 46 turns on rather than transistor 45. Relay 20 operates instead of relay 10. Contacts 20–1 and 20–3 open, and line relay 30 is again prevented from operating. As contacts 20–2 are now closed, the ringing current from source 21 is applied to the ring conductor. This current flows through ringer 11 to notify the ring party of the call. When the ring party answers the current is extended to the tip conductor. The tip station is not rung as the voltage across ringer 6 is insufficient to operate the ringer, this voltage again being smaller in magnitude than the source voltage due to off-hook subset impedance 8. The ringing current is extended, however, through contacts 10–1, primary winding 27–1, and contacts 20–4 to ground. Once again a ringing signal is induced in secondary winding 27–3, and the samples transmitted through switch 42 notify control 43 of the answer. The negative ringing control signals are no longer applied over conductor 82 in alternate time slots, transistor 46 turns off, and relay 20 releases. Line current now flows and relay 30 operates. The control pulses on conductor 44 now appear on conductor 92 and the call is supervised for its duration in the same manner as it is when the tip party is called.

If the tip station is being rung, contacts 10–5 are closed, and resistor 28 is in parallel with primary winding 27–2. This resistive loading of the primary winding is to insure that longitudinal voltages will not result in erroneous signals being transmitted back through the switching network to the control 43 to falsely indicate an answer. Only the extended ringing current induces a signal in secondary winding 27–3. Similarly, if the ring party is being rung contacts 20–5 are closed, and resistor 20 loads primary winding 27–1 for the same purpose.

The method of extending the ringing signal itself back through the switching network to the control is possible in the illustrative embodiment of the invention only during the ringing intervals when ringing current is actually applied to the line. During the silent intervals, however, relays 10 and 20 are both released, and ringing current is not applied to the line in the first place. Consequently, it cannot be transmitted back through the switching network when the called party answers. In the illustrative embodiment of the invention an answer during a silent interval of ringing is detected in the same manner as a service request. During a silent interval all of contacts 10–1, 10–3, 20–1 and 20–3 are closed. Line relay 30 is thus not prevented from operating if the called party goes off-hook during a silent interval as it is if he goes off-hook during a ringing interval. If the called party goes off-hook during a silent interval, relay 30 operates, and contacts 30–4 close. The control pulses on conductor 44 are now transmitted to scan bus 91 and over conductor 92 to the control 43. The latter, knowing that a party on the line is being run, interprets the pulses on conductor 92 as indicating an answer, rather than a service request. By utilizing the service request circuitry to verify an answer during a silent interval, the control is notified of the answer immediately. Otherwise, the control would not be so notified until the ringing current were again applied to the line and extended back through the switching network at the termination of the silent interval.

*Party identification*

For an originating call, control 43 must determine which of the two stations on the line is to be billed. As described above, either station going off-hook to originate a call results in the operation of relay 30 and the appearance of the control pulses 60 on conductor 92. The control to determine the identity of the calling station, transmits positive control signals from control signal source 65 over conductor 82 to the line circuit. These signals are the same as those for ringing the tip station and as a result relay 10 operates. Contacts 10–1 and 10–3 open as in a terminating call, and relay 30 would ordinarily release. However, contacts 30–3 are now closed, as relay 30 is first operated in an originating call. Thus when contacts 10–7 close, current flows from source 31 through the lower winding of relay 30, contacts 30–3 and 10–7, and resistor 29 to ground. Relay 30 is a slow release relay to insure that the relay remains operated; that is, to insure that contacts 10–7 close before contacts 30–3 open. Thus, although the line current no longer flows, relay 30 remains operated. As contacts 30–1 remain open, ringing current is not applied to the tip conductor. Contacts 10–2 and 30–2 are both closed and current flows from ground through resistor 9, contacts 7–3, 10–2, and 30–2, and the winding of relay 20 to negative source 75 if the tip party originated the call. If the ring party originated the call, contacts 7–3 are open, and relay 20 does not operate. If the tip party originated the call, relays 20 and 30 are both operated and the potential of source 51 is extended through contacts 30–4 and 20–6, and resistors 53 and 55 to diode 57. The control pulses on conductor 44 are transmitted over conductor 92 to the control 43, to notify the latter that the tip party originated the request. On the other hand, if the ring party originated the call, relay 20 is unoperated and contacts 20–6 are open. As contacts 10–6 are also open the potential of source 51 is not extended to the diode, and the control pulses 60 are not transmitted to control 43. The absence of these pulses is an indication to the control 43 that the ring party originated the call. In this manner the same circuitry which is utilized for detecting a service request, or an answer during the silent interval, is also utilized in the two party identification sequence. After the control has determined the identity of the calling party, the positive control signals on conductor 82 are no longer applied and relay 10 releases. At this time relay 30 remains operated from the line current rather than from the current flowing through contacts 30–3 and 10–7, contacts 10–7 now being open. Relay 20 also releases, if it was priorly operated, as contacts 10–2 are now open.

A similar line circuit may be provided with any single-party or multi-party line in the system. For example, full selective ringing may be provided for a four-party line by transmitting four different ringing control signals to the line circuit and in response thereto by applying the conventional positive or negative ringing current to either the tip or ring conductor. When the call is answered the ringing current may be extended to the other conductor for transmission back through the switching network to the control. Thus, although the invention has been described with reference to a specific embodiment, it is to be understood that this embodiment is only illustrative of the application of the principles of the invention, and that various modifications may be made therein without departing from the spirit and scope of the invention.

What is claimed is:

1. A telephone line circuit comprising tip and ring line conductors having a first station with a ringer connected to said tip conductor and a second station with a ringer connected to said ring conductor, a time division switching network, means responsive to first control signals transmitted from a control unit through said switching network for applying ringing current to said ring conductor, means responsive to the transmission of second control signals from said control unit through said switching network for applying ringing current to said tip conductor, and means responsive to the answer of a call at either of said stations for modifying said ringing current and for transmitting said modified ringing current through said time division switching network to said control unit.

2. A telephone line circuit in accordance with claim 1 further including means for notifying said control unit when one of the stations on said line goes off-hook to either originate a service request or to answer a terminating call during a silent interval of ringing, and means for inhibiting the operation of said notifying means when a called station goes off-hook during a ringing interval.

3. A telephone line circuit in accordance with claim 2 further including means responsive both to said second control signals being transmitted from said control unit and to one of the stations on said line having priorly originated a service request for controlling the operation of said notifying means to notify said control unit of the identity of said originating station.

4. A telephone line circuit in accordance with claim 2 further including a line relay connected to said tip and ring conductors for controlling the operation of said notifying means when one of the stations on said line goes off-hook, means responsive to said first or second control signals being transmitted from said control unit for inhibiting the operation of said line relay when one of the stations on said line goes off-hook when said line relay is initially unoperated, and means responsive to the transmission of said second control signals from said control unit and to the prior operation of said line relay for maintaining said line relay operated and for controlling said notifying means to notify said control unit of the identity of the station on said line having originated a service request.

5. A telephone line circuit connected to tip and ring line conductors and through a time division switching network to a control unit comprising a transformer having two primary windings connected respectively to said tip and ring conductors and a secondary winding connected to said switching network, and means for detecting an off-hook condition in said line circuit comprising means responsive to first and second control signals transmitted from said control unit through said switching network for applying ringing current to either said tip or ring conductor, means responsive to an off-hook condition for extending said ringing current to the other of said conductors and to the respective one of said primary windings, and means for extending an induced ringing signal in said secondary winding through said switching network to said control unit.

6. A communication system having a line circuit comprising tip and ring conductors, a first station with a ringer connected to said tip conductor and a second station with a ringer connected to said ring conductor, a time division switching network, a control unit connected through said time division switching network to said line circuit, means in said control unit for applying control signals through said time division switching network to said line circuit, means in said line circuit responsive to said control signals for selectively applying ringing current to either of said station ringers, and means in said line circuit responsive to the answering of a call at either of said stations for modifying said ringing current and for transmitting said modified ringing current back through said time division switching network to said control unit for enabling said control unit to detect a called party's answer.

7. A telephone system in accordance with claim 6 further including switching means connected to said tip and ring conductors for detecting a service request, and means responsive to said switching means for notifying said control unit of said service request.

8. A telephone system in accordance with claim 7 further including means responsive to the operation of said switching means and the transmission of said control signals from said control unit through said switching network to inhibit the operation of said ringing current applying means and to control the operation of said notifying means to notify said control unit of the identity of the party on said line having originated a service request.

9. A telephone system in accordance with claim 6 further including means for extending said ringing current to said tip conductor when the called station goes off-hook responsive to the application of ringing current to said ring conductor and for extending said ringing current to said tip conductor when the called station goes off-hook responsive to the application of said ringing current to said ring conductor, and wherein said means for transmitting said modified ringing current back through said time division switching network to said control unit includes means connected between said tip and ring conductors and said switching network and operative responsive to the extending of said ringing current to either of said conductors for applying said modified ringing current to said switching network.

10. A telephone system in accordance with claim 6 further including means for applying said control signals and for detecting said modified ringing current transmitted through said switching network in alternate time slots of the same number.

11. In a telephone system having a switching network, a control unit, and a line comprising tip and ring conductors, a line circuit connected between said switching network and said tip and ring conductors comprising transformer means having respective primary windings connected to said tip and ring conductors and a secondary winding connected to said switching network, a line relay connected through said primary windings to said tip and ring conductors and operative responsive to a station on said line going off-hook to originate a service request, means responsive to said line relay being unoperated and to the transmission of first and second control signals from said control unit through said switching network for respectively applying ringing current to one of said tip and ring conductors and for inhibiting the operation of said line relay, means responsive to a called station going off-hook for extending said ringing current to the other of said conductors and through the connected one of said primary windings, means for transmitting a current induced in said secondary winding by said ringing current in said connected primary winding through said switching network to said control unit to enable said control unit to detect an answer by a called party, and switching means responsive to the operation of said line relay for notifying said control unit of a service request or an answer by a called party during a silent interval of ringing, and responsive to the transmission of said first control signals from said control unit through said switching network and to the prior operation of said line relay for operating responsive to a service request having been originated by a preselected station on said line to notify said control unit of the identity of the originating station.

12. A communication system comprising a plurality of lines and associated line circuits, a signal source, a time division switching network for interconnecting said lines selectively in pairs, means for transmitting a control signal through said switching network to a selected one of said associated line circuits, means in said selected associated line circuit responsive to receipt of said control signal for connecting said signal source to said line, and means for coupling said signal source through said associated line circuit to said switching network when a station on said line goes off-hook in response to receipt of a signal from said signal source.

13. A communication system comprising a plurality of stations, a time division switching network, a plurality of lines and line circuits associated with said lines connecting said stations to said switching network and means for activating said switching network to interconnect said lines selectively in pairs, means for applying a control signal through said network to a selected one of said lines, means in said line circuit associated with said selected line responsive to receipt of said control signal for applying a ringing signal to a selected one of said stations connected to said selected line, and means operative in response to activation of said selected station for applying said ringing signal through said selected line to said switching network.

14. In a time division switching system, a time division talking bus, a line circuit including a tip and a ring conductor, means for connecting said line circuit to said bus in discrete time intervals, a first station with a ringer connected to said tip conductor, a second station with a ringer connected to said ring conductor, a source of ringing signals, scanning means for detecting the state of said line circuit, first means for applying said ringing signals to said first station ringer only, second means for applying said ringing signals to said second station ringer only, means responsive to said stations going off-hook during application of said ringing signals for transmitting said ringing signals to said bus, and means for disabling said scanning means during application of said ringing signals and for enabling said scanning means responsive to said stations going off-hook during a silent interval between application of said ringing signals.

No references cited.

KATHLEEN H. CLAFFY, *Primary Examiner.*

WILLIAM C. COOPER, *Examiner.*